G. A. WOOD.
TRUCK BODY TILTING MECHANISM.
APPLICATION FILED JAN. 15, 1917. RENEWED OCT. 17, 1919.
1,325,662.
Patented Dec. 23, 1919.
2 SHEETS—SHEET 1.
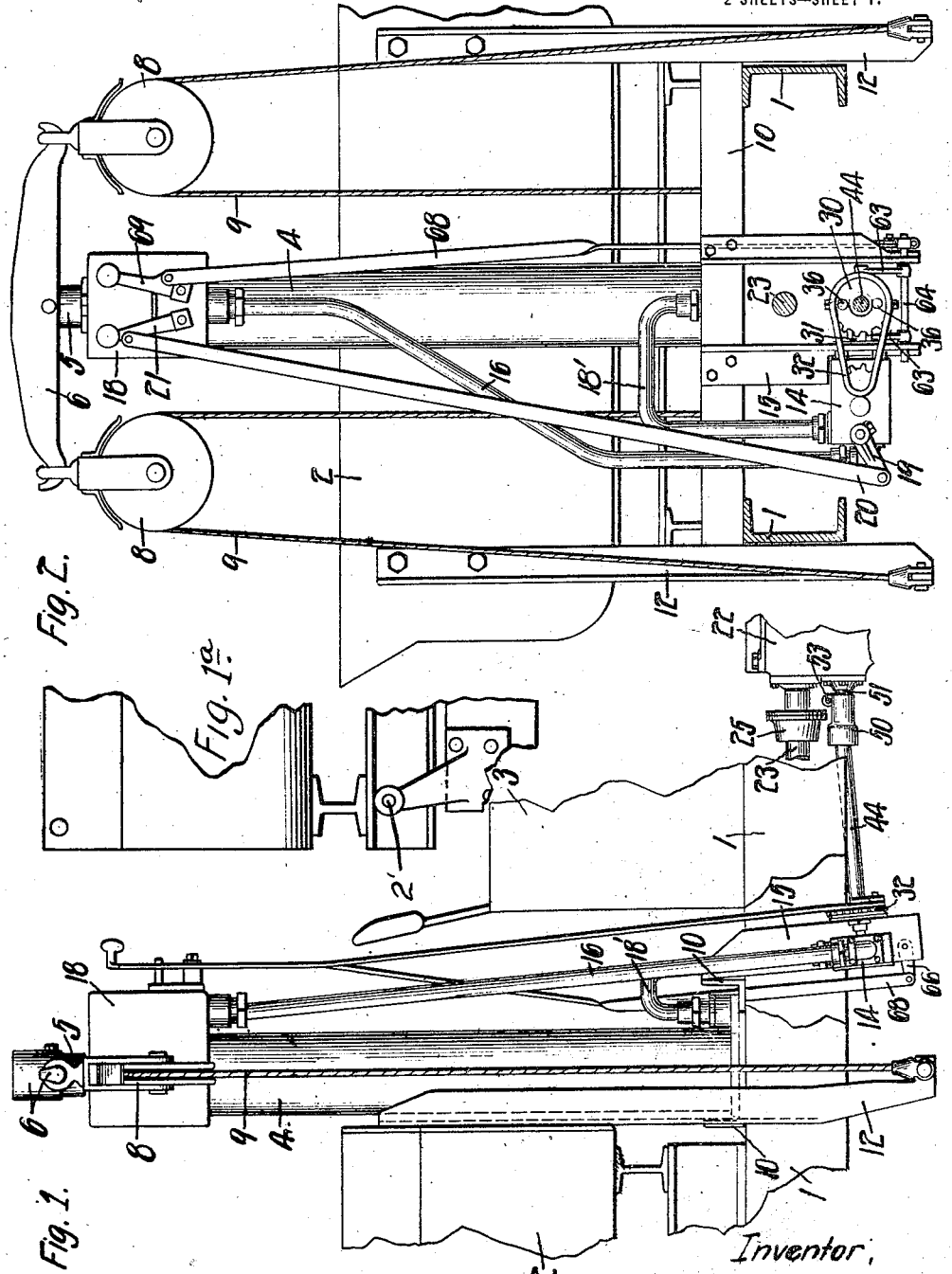
Inventor,
Garfield A. Wood,
By Pagelsen n Spencer,
Attys G. A. WOOD.
TRUCK BODY TILTING MECHANISM.
APPLICATION FILED JAN. 15, 1917. RENEWED OCT. 17, 1919.
1,325,662.
Patented Dec. 23, 1919.
2 SHEETS—SHEET 2.
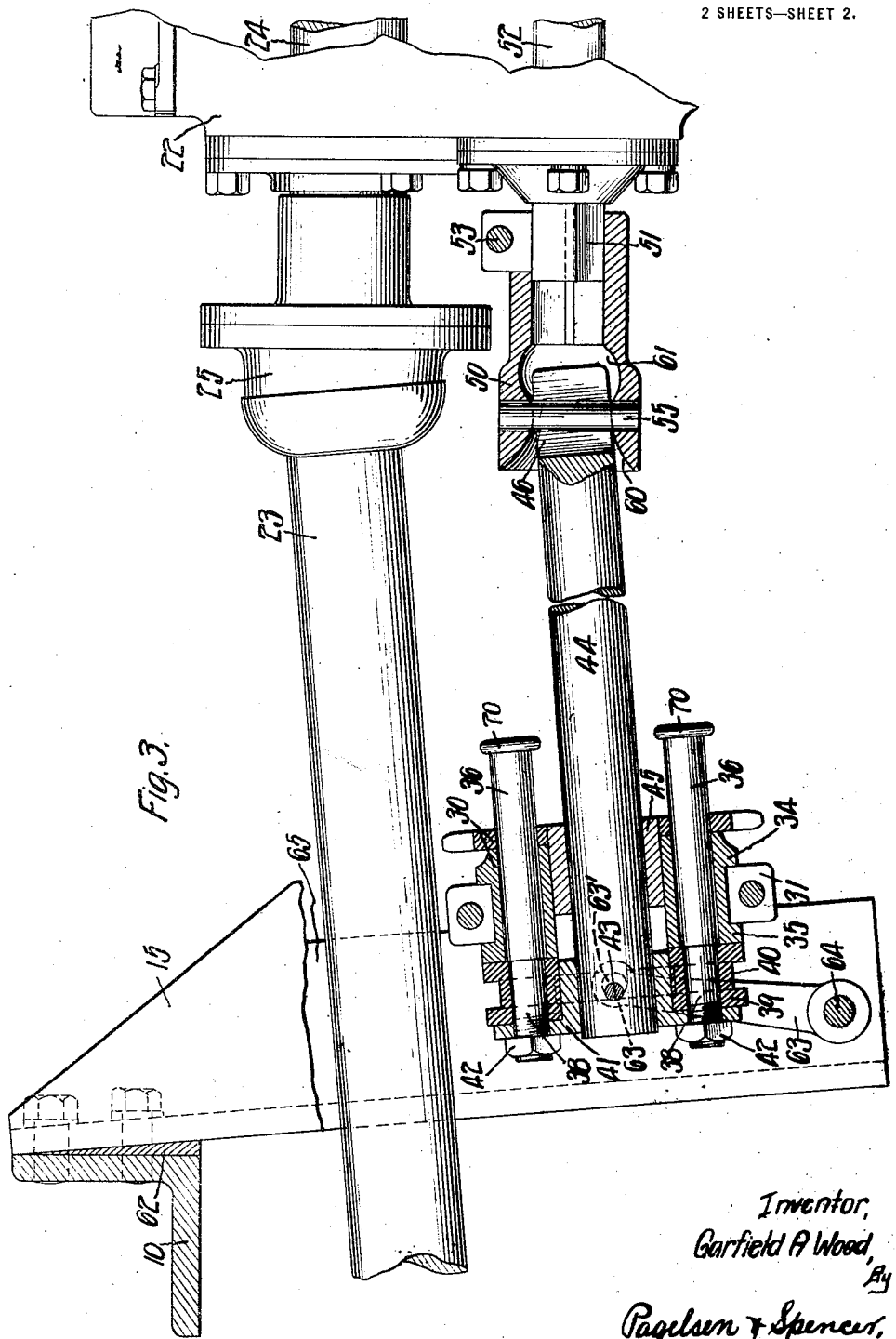
Inventor,
Garfield A Wood,
By
Pagelsen & Spencer,
Attys

UNITED STATES PATENT OFFICE.

GARFIELD A. WOOD, OF DETROIT, MICHIGAN.

TRUCK-BODY-TILTING MECHANISM.

1,325,662.  Specification of Letters Patent.  Patented Dec. 23, 1919.

Application filed January 15, 1917, Serial No. 142,405. Renewed October 17, 1919. Serial No. 331,509.

*To all whom it may concern:*

Be it known that I, GARFIELD A. WOOD, a citizen of the United States, and residing at Detroit, in the county of Wayne and State of Michigan, have invented a new and Improved Truck-Body-Tilting Mechanism, of which the following is a specification.

It is customary to use a hydraulic hoisting cylinder to tilt the body of a motor truck for dumping purposes, and the present invention relates primarily to mechanism for driving the pump which supplies liquid (oil) to the cylinder, although the parts may be put to other use, for example, they may be arranged to drive a drum or capstan. The invention consists in a transmission or gear box located forwardly of the hoisting cylinder, a propeller shaft extending rearwardly from the gear box to the rear axle and being free to vibrate in the usual way as the axle rises and falls, a driven shaft of the transmission, and means out of alinement with the driven shaft and the propeller shaft whereby clearance is afforded for the latter and whereby the pump (or other device) may be driven. Again, the invention consists in the driven shaft of the transmission, a clutch shaft or bar out of alinement with said driven shaft and movable along its own axis toward and from the latter for connection with or disconnection therefrom, and means driven by the clutch shaft for actuating the pump (or other device). It further consists in the transmission shaft and the slidable clutch shaft out of alinement therewith, together with a cross-pin associated with one of the shafts and a divided end for the other shaft whereby the clutch shaft may be driven at will from the transmission shaft without the use of an additional universal joint. It also consists in an upwardly projecting hoisting device located forwardly of the front end of the truck body and arranged to tilt the latter, together with a hoist actuating element (as shown, a pump) and a transmission counter shaft whereby the hoist actuating element is driven, and means, supported on the hoisting device and actuated from a point within reach of a driver sitting on the seat, whereby the connection between the countershaft and the hoist actuating element is made or broken at will. The invention also consists in the details of construction shown, described and claimed.

In the drawings, Figure 1 is a fragmentary side elevation of a motor truck, parts being broken away, showing a preferred embodiment of the invention. Fig. 2 is a vertical section looking rearwardly from a plane immediately behind the seat. Fig. 3 is an enlarged vertical longitudinal section through the driving elements. Fig. 1ª is a continuation of Fig. 1.

1 indicates the side bars, 2, the body pivoted to swing vertically about horizontal pivots 2' located near the rear end thereof, 3, the driver's seat, 4, the upright cylinder having a piston (not shown), the upper end of the piston rod 5 of which has pivotally mounted thereon an equalizing cross bar 6. Suspended from the cross bar are sheaves 8 over which pass cables 9, the inner ends of which are attached to a cross frame which is preferably formed of bars 10 upon which the cylinder is directly supported, or to some other fixed point at the base of the cylinder. The outer ends of the cables are attached to the lower end of the body arms 12 that depend from the front end of the body. A gear pump 14 supported on a member 15 depending from the cross frame draws liquid through the suction pipe 16 and expansion chamber 18 from the upper end of the cylinder and delivers it to the lower end of the latter through the pipe 18' for hoisting purposes, but by means of suitable passages in the pump and a proper valve (the actuating arm 19 of which may be joined by a link 20 to a hand lever 21 on the expansion chamber) the liquid may be allowed to by-pass the pump gears or to circulate continuously within the pump as desired. These features are shown and claimed in my prior applications for patent, Serial Numbers 14479 and 14480, filed March 15, 1915; 115,957, filed August 21, 1916; 117,236, filed August 28, 1916; 135,797, filed December 8, 1916; and 138,762, filed December 26, 1916 and may be widely varied in so far as the present invention is concerned.

The gear box wherein are suitable transmission gears (not shown) appears at 22 and the propeller shaft 23 is connected to the main driving shaft 24 of said transmission by means of a universal joint 25, it being understood that the propeller shaft extends rearwardly to the rear axle and therefore swings vertically in respect to the axis of the shaft 24 in the customary manner. As the shaft 24 in this installation rotates only when the vehicle is running, it cannot be used for the purpose of driving the pump. The mechanism whereby this is accomplished will now be described.

30 indicates a hollow sprocket gear (which may be made in two pieces rigid with one another, as shown, or integral) rotatable in a suitable bearing 31 supported on the lower end of the member 15; this gear when rotated drives the pump 14 through the medium of the chain 32, but spur gears might be used in lieu thereof in some cases. Flanges 34 and 35 on the gear 30 prevent it from sliding through the bearing. The gear 30 is perforated to receive pins or guides 36 having the slightly reduced ends 38 which pass through the spool-shaped member 39 (having the peripheral groove 40) and also through the flanged bushing 41, and have securing nuts 42 thereon. It is apparent that the members 39 and 41 may be made in one piece. Fitting closely in the bore of the bushing and connected thereto by the pin 43 is a clutch bar or extension shaft 44 which projects forwardly through the bore of the gear 30, a bushing 45 being preferably pressed into the gear to relieve the guide pins 36, although this bushing may be omitted. At its forward end the clutch bar is slotted transversely as indicated at 46, and is received in a socket formed in a member 50 having a split forward end fitting over and clamped rigidly upon the squared projecting end 51 of a driven shaft 52 of the transmission by a bolt 53. The shaft 52, it will be understood, may be rotated regardless of whether the propeller shaft is being rotated or not by any suitable arrangement of gearing, which need not be shown. When the shaft 44 is thrown forwardly, its divided end embraces a pin 55 that extends across the socket in the member 50, but when the shaft is at the limit of its rearward movement it is disengaged from the cross-pin. Thus the clutch gear may be driven from the shaft 52 regardless of lack of initial alinement therewith and without the use of a separate clutch and universal joint, and the necessary deflection of the cross frame (incident to the lifting of heavy loads) is allowed. Clearance is also afforded thereby for the propeller shaft 23. It is preferred to make the socket with a flaring mouth 60 and an enlarged portion 61 forwardly of the cross-pin 55. By a reversal of parts the socket member might be attached to or formed with the shaft 44, in which case the shaft 52 would have a divided end.

In order to arrange the member 15 at right angles to the axis of the shaft 44, a shim 62 is provided between it and the cross-bar 10.

The shaft 44 may be shifted by means of the yoke arms 63 having studs 63' projecting into the groove 40, the arms 63 being rigid with a shaft 64 mounted in the lower end of the member 15 and a companion member 65 which depends from the frame 10 on the opposite side of the propeller shaft, or by any other preferred element, but it is important, although not entirely necessary, that the arms 63, or the equivalent thereof, be actuated from a point within reach of the driver. This is conveniently secured by the arm 66, link 68 and hand lever 69 located on the expansion chamber or other fixed member near the top of the cylinder. The value of a construction of this character also arises from the fact that the hoist is made by one manufacturer and the chassis by many others; consequently if the controlling lever were mounted independently of the hoisting unit, the construction would vary with each particular type of chassis whereas the present construction is equally applicable to all. It will be seen that the linkage 66—68—69 is so arranged that its weight tends to retain the shaft 44 out of engagement with the pin 55 whenever the lever 69 becomes jarred or otherwise loosened from its support, which prevents the pump from being accidentally driven as the vehicle travels along the roadway. If desired, the pins 36 may have end ribs 70 for limiting the rearward movement.

The details of construction may be varied between wide limits without departing from the spirit of the invention, and I do not, therefore, wish to be limited except as indicated by the subjoined claims.

I claim:—

1. A motor vehicle including a frame, a body mounted thereon to tilt, a hoisting mechanism for tilting the body to dump its contents, a gear box, a propeller shaft extending rearwardly from said gear-box, a counter-shaft projecting rearwardly from said gear-box, a driving gear for the hoisting mechanism, the axis of said driving gear being out of alinement with the axis of the counter-shaft, and means whereby said gear may be connected to or disconnected from the counter-shaft at will, said means including a shaft slidable bodily toward and from the gear box.

2. A motor vehicle including a frame, a gear box, a propeller shaft extending rearwardly from said gear box, a countershaft in said gear box, a gear rearwardly of the gear box, the axis of said gear intersecting but being out of alinement with the axis of the counter-shaft, a gear-driving shaft co axial with the gear and means whereby said gear-driving shaft may be connected to or disconnected from the counter-shaft at will.

3. A motor vehicle comprising a frame, a gear box, a rotatable driven shaft therein, a rotatable member out of alinement with the shaft, shafting slidable through the rotatable member toward and from the gear box, said rotatable member forming a bearing for one end of the shafting, the rotatable member having a second bearing farther from its axis than the first mentioned bearing, means fixed to the shafting and slidable in respect to the second bearing, and means for shifting the shafting toward and from the gear box to connect the shafting to the driven shaft at will.

4. A motor vehicle including a frame, a gear box, a propeller shaft extending rearwardly from the gear box, a counter shaft in the gear box and having an end projecting therefrom, a gear rearwardly of the gear box, shafting rotatable with said gear and slidable toward and from the end of the counter shaft, a fixture secured to the projecting end of the counter shaft, said fixture supporting the front end of the shafting, the fixture and shafting being so constructed and arranged that the shafting is caused to turn with the counter shaft when at one limit of its movement and is disconnected therefrom when at the other limit of its movement.

5. A motor vehicle including a frame, a gear box, two parallel shafts in said gear box, a driven shaft constantly connected to the first of said shafts by a universal joint whereby it is allowed to swing, a gear located on the same side of the gear box as is the driven shaft, the axis of said gear intersecting with but being out of alinement with the second of said parallel shafts and also being inclined to the axis of the first parallel shaft, and means whereby said gear may be connected to or disconnected from the second parallel shaft at will.

6. A motor vehicle including a frame, a gear box, two parallel shafts in said gear box, a driven shaft constantly connected to the first of said shafts by a universal joint whereby it is allowed to swing, a gear located on the same side of the gear box as is the driven shaft, the axis of said gear intersecting with but being out of alinement with the second of said parallel shafts and also being inclined to the axis of the first parallel shaft, and means including a clutch shaft slidable longitudinally of the axis of said gear whereby said gear may be connected to or disconnected from the second parallel shaft at will.

7. A motor vehicle comprising a frame, a gear box, a rotatable countershaft for the gear box, a rotatable member spaced from the gear box longitudinally of the vehicle, shafting through which torque for driving the rotatable member from the countershaft may be transmitted, and means for shifting the shafting longitudinally of the vehicle to establish driving connection between the parts or to break such connection at will.

8. A motor vehicle including side bars, a cross frame mounted on said side bars, a tiltable body supported on the side bars, hoisting means mounted on said cross frame for tilting said body, a driving gear for the hoisting means also mounted on said cross frame, a gear box forwardly of said cross frame, a counter shaft projecting rearwardly therefrom, the axis of said driving gear for the hoisting means intersecting but being out of alinement with the axis of the counter shaft, and means including a clutch shaft slidable longitudinally of the axis of the driving gear whereby said gear may be connected to or disconnected from the counter shaft at will.

9. In a motor vehicle, transmission gearing including a rotatable element, a hoisting mechanism driving gear out of alinement with the axis of said element but having its axis arranged to substantially intersect said first mentioned axis, a clutch shaft slidable longitudinally of the axis of said gear, said rotatable element and said shaft constituting two members, one of the members having a bifurcated end and the other having a socket and cross-pin adapted to be received between the bifurcations of said end when said clutch shaft is in one position whereby the clutch shaft and gear may be driven from the rotatable element at will.

10. In a motor vehicle, a frame, a body pivoted to tilt thereon, an upright hoisting device mounted on the frame forwardly of the body whereby the latter may be tilted, transmission gearing including a rotatable element, a hoisting mechanism driving gear out of alinement with the axis of said element but having its axis arranged to substantially intersect said first mentioned axis, a clutch shaft slidable longitudinally of the axis of said gear, said rotatable element and said shaft constituting two members, one of the members having a bifurcated end and the other having a socket and cross-pin adapted to be received between the bifurcations of said end when said clutch shaft is in one position whereby the clutch shaft and gear may be driven from the rotatable element at will, and means, including a hand lever mounted on said hoisting device near the upper level thereof, whereby said clutch shaft may be slid longitudinally at will.

11. A motor vehicle including a frame, a gear box, a propeller shaft extending rearwardly from the gear box, a countershaft in said gear box, a gear spaced from the gear box longitudinally of the vehicle, the axis of the gear being out of alinement with the axis of the countershaft, and shaft means shiftable bodily toward and from the gear box whereby the gear may be connected to or disconnected from the countershaft at will.

12. A motor vehicle including a frame, a gear box, a propeller shaft extending from the gear box longitudinally of the vehicle, a countershaft in said gear box, a gear spaced from the countershaft longitudinally of the vehicle, the gear being positioned on the same side of the gear box as is the propeller shaft and having its axis lying substantially in the same vertical plane as the latter, the axis of said gear being out of alinement with the axis of the countershaft, and shaft means shiftable toward and from the countershaft for connecting the gear to the countershaft at will.

13. A motor vehicle including a frame, a body pivoted to tilt thereon, a hoisting device mounted on the frame whereby the body may be tilted, transmission gearing including a rotatable element, a hoisting mechanism driving gear out of alinement with the axis of said element, a plurality of guide pins slidable through the gear, clutch shafting rotatable with said gear and connected to said pins, said clutch shafting being slidable toward and from the transmission gearing to be connected to the rotatable element or disconnected therefrom at will.

14. A motor vehicle including a frame, a body pivoted to tilt thereon, a hoisting device mounted on the frame whereby the body may be tilted, transmission gearing including a rotatable element, a hoisting mechanism driving gear out of alinement with the axis of said element, clutch shafting slidable through said gear toward and from the transmission, a grooved member secured to the clutch shafting on the side of the gear most remote from the transmission gear, and means coöperating with said grooved member for shifting the clutch shafting toward and from the transmission gearing to connect the shafting to the rotatable element at will.

15. A motor vehicle comprising a frame, a gear box, a rotatable driven shaft therein, a gear out of alinement with said shaft, shafting slidable through said gear, a plurality of pins slidable through said gear for causing said shafting to rotate therewith, and means for shifting the shafting toward and from the gear box to connect the shafting to said driven shaft at will.

16. A motor vehicle including a frame, a gear box, a rotatable shaft therein, a gear located to one side of the gear box, said gear being out of alinement with the shaft, pins slidable through the gear, clutch shafting rotatable with the gear and slidable toward and from the gear box to be connected to the shaft at will, said gear and said pins together constituting means for limiting the movement of the shafting away from the gear box.

17. A motor vehicle comprising side bars, a gear box, a rotatable countershaft for the gear box, a rotatable member spaced from the gear box, supporting means for said member extending across between the side bars, shafting through which torque for driving the rotatable member from the countershaft may be transmitted, said shafting including a disconnectible connection proximate to the gear box, and having at least one of its elements supported thereby and means, carried by the supporting means for the rotatable member, for making or breaking said connection at will.

18. A motor vehicle comprising side bars, a gear box, a rotatable member carried by the gear box, a hoisting unit supported by the side bars and spaced from the gear box, said unit including a rotatable member, means for driving the last named rotatable member from the first named rotatable member, said means including a disconnectible connection positioned substantially at the gear box and having one of its elements supported by said gear box, and means supported by said unit for making or breaking said connection at will.

GARFIELD A. WOOD.